M. L. BASTIAN.
TIRE INFLATING PUMP.
APPLICATION FILED DEC. 13, 1909.

957,597.

Patented May 10, 1910.
3 SHEETS—SHEET 1.

Witnesses
Thos. Rosemann
Rose H. Krenkel

Inventor
Martin Luther Bastian,
By Joshua R. H. Potts,
Thomas Biddle Ellis,
John H. Ringe.
Attorneys

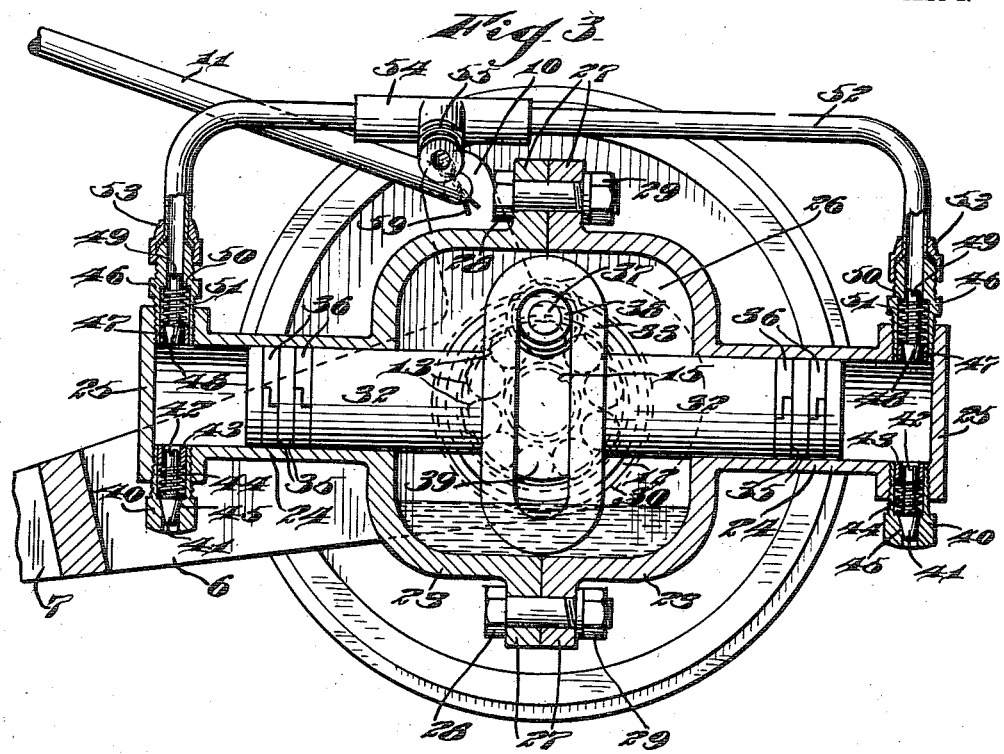

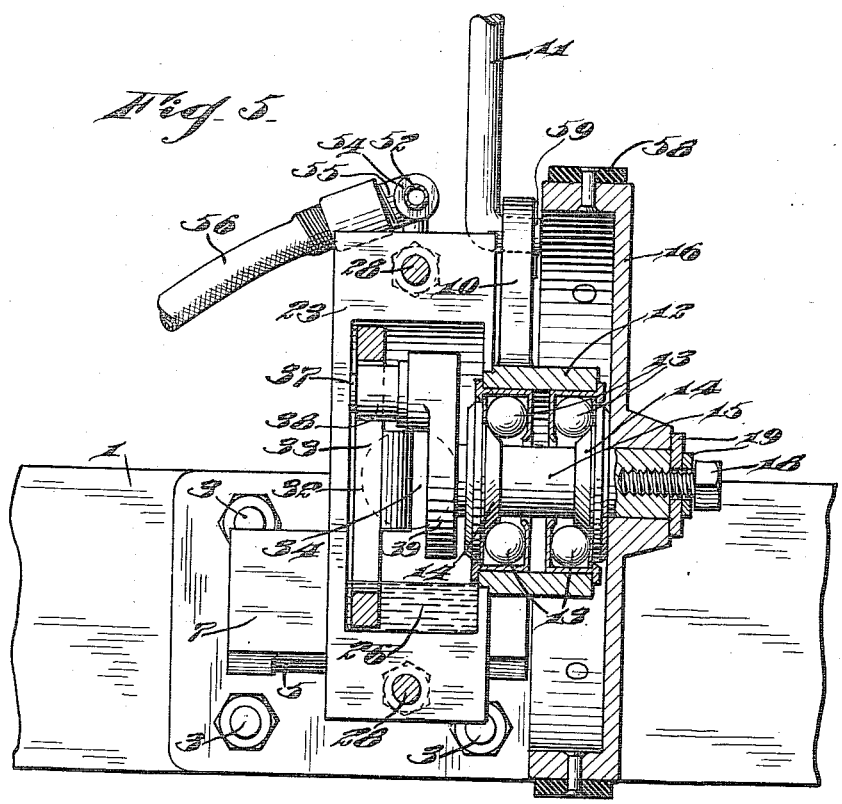

UNITED STATES PATENT OFFICE.

MARTIN LUTHER BASTIAN, OF PHILADELPHIA, PENNSYLVANIA, ASSIGNOR TO OLNEY AUTOMOBILE COMPANY, LIMITED, OF PHILADELPHIA, PENNSYLVANIA.

TIRE-INFLATING PUMP.

957,597. Specification of Letters Patent. Patented May 10, 1910.

Application filed December 13, 1909. Serial No. 532,765.

*To all whom it may concern:*

Be it known that I, MARTIN LUTHER BASTIAN, a citizen of the United States, residing at Philadelphia, in the county of Philadelphia and State of Pennsylvania, have invented certain new and useful Improvements in Tire-Inflating Pumps, of which the following is a specification.

My invention relates to improvements in tire inflating pumps, and more particularly to tire inflating pumps for motor vehicles adapted to be driven by the fly wheel of the engine, the object of the invention being to provide improvements of this character which will maintain a high air pressure with a continuous flow and in which all of the essential operating parts are inclosed in the lubricant tight casing or housing, in which a supply of lubricant is maintained, which is fed by the reciprocation of the cross head to various parts of the pump to maintain an easy running machine.

A further object is to provide an improved mounting for a pump of this character with improved means for moving the pump so as to position its frictional drive wheel into or out of engagement with the fly wheel of the engine.

A further object is to provide a pump of this type with pistons and cylinders in tandem, and the pistons integral with a slotted cross head between them, in which the eccentric pin of a drive shaft moves to reciprocate the pistons together with an improved arrangement and construction of valves, whereby a maximum of pressure is attained by a minimum of power.

With these and other objects in view the invention consists in certain novel features of construction and combinations and arrangements of parts, as will be more fully hereinafter described and pointed out in the claims.

Figure 1:
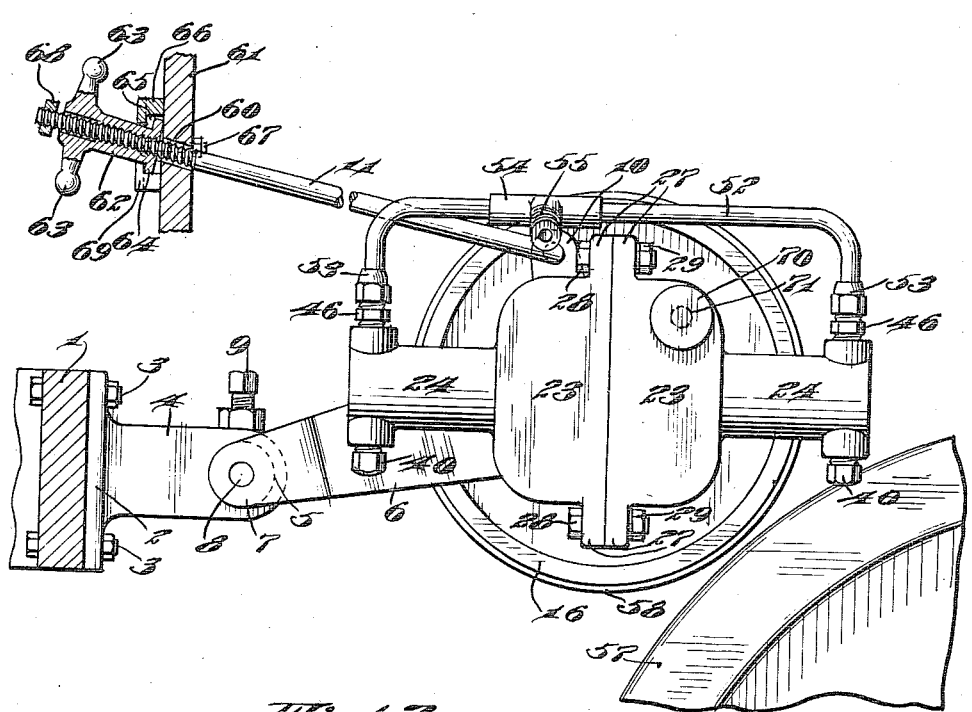
Figure 2:
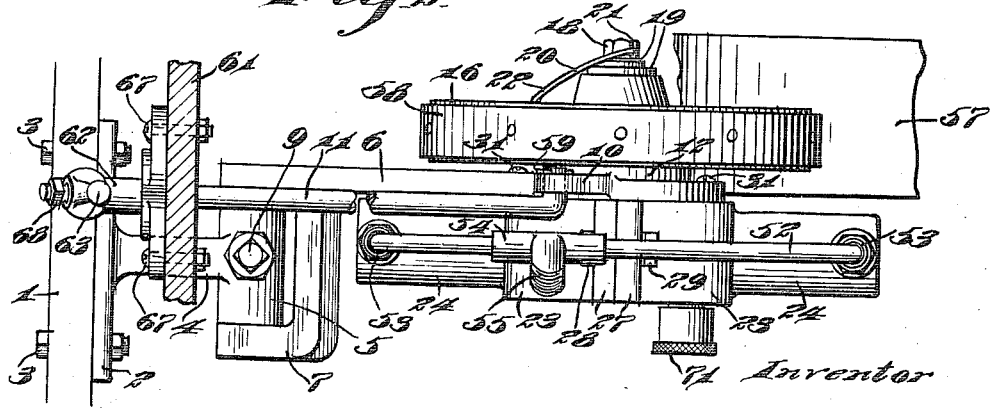

In the accompanying drawings: Figure 1 is a view partly in elevation and partly in section illustrating my improvements. Fig. 2 is a top plan view of Fig. 1. Fig. 3 is a somewhat enlarged view in longitudinal, vertical section through the pump proper. Fig. 4 is a view in longitudinal transverse section. Fig. 5 is a view in vertical, transverse section through the center of the pump and its operating mechanism, and Figs. 6, 7, and 8, are views of various details of construction.

1 represents a fixed part of the machine frame and 2 a bracket secured by bolts 3 to frame 1, and provided with an outwardly projecting arm 4 having a cross sleeve 5 at its free end.

6 is a link having a bifurcated inner end 7, the members of which are located at the ends of sleeve 5 and are provided with openings registering with the openings in the sleeve, and a journal pin 8 is located in said openings and is secured against longitudinal movement by means of a set screw 9 in the sleeve, said pin serving to pivotally connect the link 6 with bracket 2. This link, near its outer end, is provided with a perforated ear 10, into which the bent end of a rod 11 projects, and the upper end of this rod is adjustably supported, as will more fully hereinafter appear, so as to adjust and support the link 6. The free end of the link 6 is made in the form of a ring 12, in which ball bearings 13 are provided, engaging conical collars 14 on the drive shaft 15, so as to provide an easy turning bearing for the shaft.

On the outer end of the shaft 15, a friction drive wheel 16 is locked by means of a key 17, and also by means of a screw 18 located in a threaded recess in the end of the shaft, and having an enlarged head at its outer end, between which and the end of the shaft, washers 19 are interposed, which overlap the hub of the drive wheel and the key 17, and to prevent any possibility of this screw becoming loose or turning, I provide a wire spring 20 which is bent at one end and positioned in an opening 21 in the head of screw 18, and at its other end in an opening 22 in the wheel 16.

My improved pump proper comprises two half sections 23, 23, each section consisting of a single integral casting and both exactly alike. Each member 23 comprises a cylinder 24 having a closed outer end 25 and an open inner end which communicates with the crank head housing 26, one-half of the housing being integral with one cylinder and the other half with the other cylinder, said housing of general rectangular form, having flat sides and flanged upper and lower meeting edges 27, between which, as well as between the vertical edges of the housing, a filling of shellac is preferably provided, and the flanged edges 27 are securely clamped by means of bolts 28 and 110 nuts 29. One side of this housing 26 is provided with a central circular opening 30, into which a reduced end of the ring 12 projects, tightly closing the opening, and screws 31 are positioned in openings in link 6 and engage in screw threaded openings in the housing 26, so as to secure the pump casing to the link and compel it to move with the link.

Inside of the pump casing is located my improved compression element, which comprises two pistons 32 located in tandem and both integral with a slotted cross head 33, said cross head and pistons being made of one single casting, and said pistons being preferably cut or recessed in one face as shown at 34, to lighten the structure. The pistons are preferably provided with annular grooves 35, into which the packing rings 36 are positioned to render the pistons tight in cylinders, and an eccentric pin 37 having a roller 38 thereon, is positioned in the slot of cross head 33, said eccentric pin being integral with a disk 39 on drive shaft 15, so that as said drive shaft 15 turns, the eccentric pin 37 will transmit a reciprocating movement to the pistons 32. Adjacent the outer closed ends of the cylinders 24, hollow screw threaded plugs 40 are screwed into threaded openings in the cylinders, and the openings through said hollow plugs are normally closed by check valves 41, constituting inlet valves for the air to the cylinders. These inlet valves are preferably provided with stems 42, which move through rings 43 secured in the plugs of greater diameter than the stems, so as to allow a free passage way around the stems, and coiled springs 44 are located around the rings between the valves 41 and the rings 43, so as to normally press the valves outward against their beveled seats 45 in the plug 40, so as to normally close said inlets, but said valves will be drawn from their seats by means of the pistons 32 as the latter begin their suction stroke.

On opposite sides of the cylinders, externally screw threaded, hollow plugs 46 are located and secured in threaded openings in the side walls of cylinders 24, adjacent their ends and preferably opposite the points of connection of plugs 40. These plugs 46 are provided at their inner ends with rings 47, secured in the plugs and against which outlet valves 48 normally seat, said valves having stems 49 of smaller diameter than the bore of the plug, said bore being of two diameters as illustrated, whereby shoulders 50 are provided, between which and the valves 47 coiled springs 51 are located to normally hold the valves 48. The plugs 46 have screw threaded outer ends, and serve as couplings between the cylinders 24 and pipes 52, said pipes being preferably secured to the plugs 46 by means of clamping collars 53, and these pipes 52 both connect to a tee 54, on which latter a nipple 55 is provided for the attachment of a hose 56, through which the air is to be forced to the tire, it being understood that the hose will be constructed as ordinary hose and be adapted for the attachment to the air inflating valves of the tire, and be of a length so as to permit all four of the tires on a vehicle to be connected with the pump as may be desired.

57 represents the ordinary fly wheel of an engine, against which the friction drive wheel 16 is adapted to be positioned, so as to be frictionally driven by the fly wheel, said drive wheel 16 being preferably provided with an outer tire of fibrous material 58, so as to insure perfect frictional engagement between the drive wheel and the fly wheel.

As above stated, the pump is normally supported by means of the rod 11, which has one end bent and projecting through the perforated ear 10 on link 6, a cotter pin 59 being positioned through this bent end so as to hold the rod in connection with the link. The outer end of this rod 11 is screw threaded throughout a portion of its length, and projects through an opening 60 in the casing 61 of the engine hood, and engages internal screw threads in a sleeve 62, having outwardly projecting radial arms 63 thereon, forming a hand hold to enable the sleeve to be readily turned. The inner end of this sleeve is made with an annular flange 64, which is located in the recessed portion 65 of an escutcheon 66, the latter secured by bolts 67 to casing 61 so as to prevent any longitudinal movement of the sleeve 62 and compel the rod 11 to be moved longitudinally when the sleeve is turned. A nut 68 is jammed on to the outer end of rod 11 so as to limit the movement of the rod in one direction and prevent the drive wheel 16 from being pressed too hard against the fly wheel of the engine.

The escutcheon 66 above referred to, is made with an opening 69, which enables the escutcheon to be placed in position or removed from its engagement with the sleeve 62 after the latter has been screwed on to rod 11, thus facilitating the assemblage of the parts and enabling a proper adjustment of the sleeve on the rod before the escutcheon is secured in place, so as to just exactly regulate the movement to be imparted to the pump.

The operation is as follows: With parts as shown in Fig. 1, drive wheel 16 is spaced from the fly wheel 57 so that there is no transmission of motion between the fly wheel and the drive wheel, and this is the normal position of the pump during the ordinary operation of the engine. When, however, it becomes necessary to inflate the tire, the vehicle is at a stand still, and after the hose 56 connects the nipple 55 with the valve of the tire to be inflated, sleeve 62 is turned so as to move the pump downwardly and press the drive wheel 16 into frictional engagement with the periphery of fly wheel 57. The engine of the vehicle is then started and the fly wheel 57 will transmit to the drive wheel 16 a rotary motion to drive shaft 15 and turn the crank eccentric pin 57 through the arc of a circle, and as this pin 57 moves through the arc of a circle, it will transmit to the cross head 33 and the pistons 32, a reciprocating movement to draw the air into the cylinders, past the inlet valves 41 as the pistons begin their suction stroke and force the air out past outlet valves 48 on the compression stroke of the pistons, the air passing through pipes 52, tee 54, and nipple 55, to the pipe 56, and from the latter to the tire, and it will be noted that as one piston is moving on its suction stroke, the other is moving on its compression stroke, so that a continuous supply of air under pressure is being forced out to the tire. When the tire is inflated, it is simply necessary to turn the sleeve 62 and raise the pump, so that the drive wheel 16 is out of engagement with the fly wheel 57 when the engine is ready for its normal operation.

In order to maintain the parts lubricated, a lubricant entrance 71 is provided in housing 26, said entrance being normally closed by cap 70, and lubricant is supplied through this entrance 71 to maintain a level of lubricant in the lower portion of the housing, as shown in Figs. 3 and 6. This level of lubricant is high enough for the lower end of the cross head 33 to move through, and the reciprocation of the pistons will cause a sufficient amount of this lubricant to be drawn to all working parts of the interior of the pump, so as to maintain them constantly lubricated, and insure an easy running machine.

Various slight changes might be made in the general form and arrangement of the parts described without departing from my invention, and hence I do not restrict myself to the precise details set forth, but consider myself at liberty to make such changes and alterations as fairly fall within the spirit and scope of the appended claims.

Having thus described my invention what I claim as new and desire to secure by Letters Patent is:

1. In a tire inflating pump, the combination of a pivoted link, a bearing ring on the free end of the link, a shaft in said ring, a pump secured against one end of said bearing ring, and operated by said shaft, a drive wheel secured on said shaft at the opposite end of said bearing ring, and means for raising and lowering the free end of said link, substantially as described.

2. In a tire inflating pump, the combination of a pivoted link, a bearing ring on the free end of said link, a shaft mounted to turn in said bearing ring, a pump casing comprising two castings, each casting forming a cylinder and a half-housing, said half-housings secured together and having an opening to receive one end of said bearing ring, pistons in said cylinders, a cross head in the housing, fixed to said pistons, an eccentric pin on said shaft engaging the cross head, a drive wheel secured on said shaft at the opposite end of said bearing ring, and means for raising and lowering said link, substantially as described.

3. In a tire inflating pump, the combination of a pivoted link, a bearing ring on the free end of said link, a shaft mounted to turn in said bearing ring, a pump casing comprising two castings, each casting forming a cylinder and a half-housing, said half-housings secured together and having an opening to receive one end of said bearing ring, pistons in said cylinders, a cross head in the housing, fixed to said pistons, an eccentric pin on said shaft engaging the cross head, a drive wheel secured on said shaft at the opposite end of said bearing ring, a perforated ear on said link near its free end, a rod secured in said perforated ear, and means for moving said rod longitudinally, substantially as described.

4. In a tire inflating pump, the combination with a support, of a bracket secured to said support, an outwardly projecting arm on said bracket, a link pivotally secured to said arm, a bearing ring on the free end of said arm, a drive shaft supported in said bearing ring, a pump supported at one end of said bearing ring and driven by said shaft, a friction wheel secured on said shaft at the other end of said link, a rod connected to the free end of said bearing ring, and means for moving said rod to positively move the link on its pivot in both directions, so as to move the friction wheel toward and away from its driving element, substantially as described.

5. In a tire inflating pump, the combination with a support, of a bracket secured to said support, an outwardly projecting arm on said bracket, a link pivotally secured to said arm, a drive shaft supported in the free end of said link, a pump supported at one side of said link and driven by said shaft, a friction wheel secured on said shaft at the other side of said link, a rod connected to the free end of said link, said rod screw threaded throughout a portion of its length, an internally screw threaded sleeve engaging the threads of said rod, means preventing longitudinal movement of the sleeve, and handles on said sleeve to facilitate the turning thereof to adjust the rod and move the link.

6. In a tire inflating pump, the combination with a support, a link pivoted to the support, a pump and friction drive wheel supported at the free end of said link, a rod connected to said link and screw threaded at its end and projecting through an opening in a fixed wall, a sleeve having internal screw threads engaging the threads of the rod, an annular flange on one end of said sleeve, an escutcheon secured to said wall and having a recess to accommodate said annular flange of the sleeve, said escutcheon having an opening in one side permitting it to be positioned on and removed from sleeve.

In testimony whereof I have signed my name to this specification in the presence of two subscribing witnesses.

MARTIN LUTHER BASTIAN.

Witnesses:
 TH. H. MARGERISON,
 R. H. KRINKEL.